July 7, 1964
H. L. PENBERTHY
3,140,334
GLASS MANUFACTURE
Filed Oct. 18, 1960
2 Sheets-Sheet 1
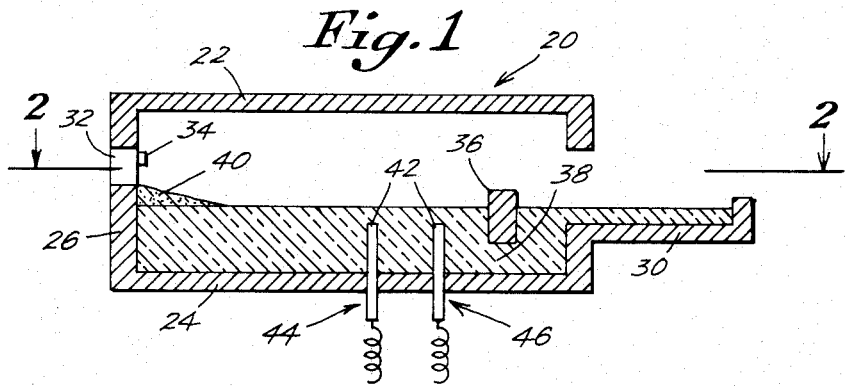
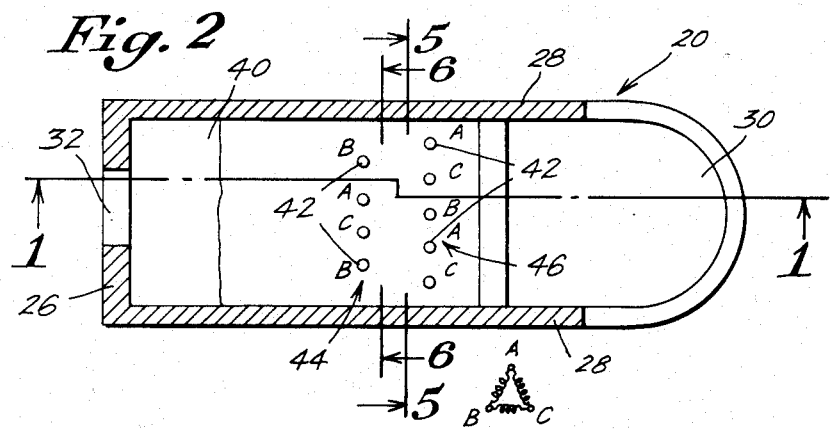
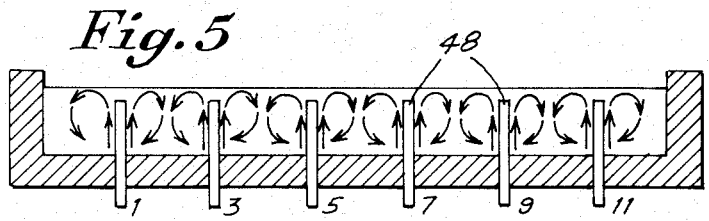
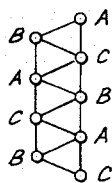
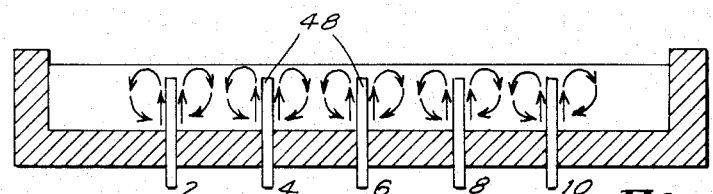
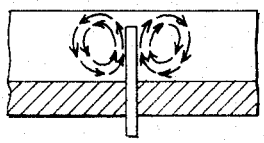
INVENTOR,
Harvey Larry Penberthy,
BY Diggins + Le Blanc
ATTORNEYS

United States Patent Office 3,140,334
Patented July 7, 1964

1

3,140,334
GLASS MANUFACTURE
Harvey Larry Penberthy, 3129 Alki Ave.,
Seattle 16, Wash.
Filed Oct. 18, 1960, Ser. No. 63,417
11 Claims. (Cl. 13—6)

This invention relates to glass furnaces and methods of glass manufacture, and more particularly to a new method and apparatus for producing homogeneous and seed-free glass efficiently and economically.

The manufacture of glass according to modern methods is carried out in continuous furnaces which are usually large and capable of containing many tons of the material which is to be melted and refined. The raw batch is introduced at one end of the tank forming the glass furnace and is gradually melted and refined as it advances slowly lengthwise of the tank. Heat for melting the batch and refining the molten glass is normally provided in the form of flames or gases of combustion applied to the surface of the material.

The heat efficiency of such furnaces in terms of heat utilized vs. heat applied is generally quite low, rarely exceeding 25% and sometimes as low as 5%. In addition, it is frequently difficult to secure satisfactory glass homogeneity, a problem which is particularly vexing when the product of the furnace is used to produce sheet glass or the like.

In an attempt to overcome such problems, those in the field of glass manufacture have turned with increasing frequency to the use of electric boosting units, and the melting and heating of the glass by means of Joule effect heating. Examples of Joule effect systems are shown, for example, in Borel Patent No. 2,277,678 and Cornelius Patent No. 2,417,913. While the systems disclosed in these patents have been effective in increasing furnace heat efficiency and, at least in the case of the Borel patent, in preventing unrefined and undissolved particles of batch, known to those versed in the art as "stones," from reaching the working zone and getting into the ware, there are several attendant disadvantages in their employment. For example, the closely spaced physical barrier type electrodes utilized by Borel present a physical obstacle to the flow of glass through the furnace and, as a result, reduce significantly the productive capacity of the furnace. On the other hand, the plate-type electrodes of the Cornelius patent require an inordinately high quantity of power to achieve any significant amount of heating of the glass batch, since the current flow through the glass is dispersed over a wide band. In addition to the foregoing, neither of the systems discussed above is particularly effective in overcoming the homogeneity problems of the prior art.

Accordang to the present invention, it has been found that it is possible to increase glass homogeneity and to improve furnace efficiency with minimum power requirements and without significantly impairing the productive capacity of any of the zones of the furnace or of the furnace as a whole. These results are effected by a novel arrangement of Joule effect electrodes adapted to result in the formation of convection currents extending both transversely and longitudinally of the flow of glass in the glass furnace.

It is accordingly a primary object of the present invention to devise a novel method and apparatus for manufacturing glass in an efficient manner and with a high degree of homogeneity.

It is another object of the present invention to provide a novel method and apparatus for manufacturing glass in which the efficiency of a combustion furnace and the homogeneity of the glass produced is improved through the utilization of a novel arrangement of Joule effect electrodes.

It is a further object of the present invention to provide a novel method and apparatus for manufacturing glass in which the efficiency of the furnace operation and the homogeneity of the glass is improved through the formation of transversely and longitudinally extending convection currents in the glass mass across a band extending substantially from one side wall to the other of the glass furnace.

It is still another object of the present invention to achieve improved heating efficiency and glass homogeneity by means of a novel Joule effect electrode assembly in conjunction with a polyphase source of electric power.

These and other objects and advantages of the present invention will become more apparent upon reference to the following specification and claims and appended drawings wherein:

FIGURE 1 is a vertical section taken through the line 1—1 of the glass furnace shown in FIGURE 2 and having electrodes arranged therein according to the present invention;

FIGURE 2 is a horizontal section taken through the line 2—2 of the glass furnace shown in FIGURE 1 and illustrating the polyphase connection of the electrodes;

FIGURE 3 is a schematic diagram illustrating current flow between electrodes arranged in accordance with the present invention;

FIGURE 4 is a vertical section showing a single electrode of the structure illustrated in FIGURE 2 and illustrating the longitudinally extending convection currents resulting from the Joule effect heating;

FIGURE 5 is a vertical section taken through line 5—5 of FIGURE 2 and illustrating the arrangement of one transverse row of electrodes arranged according to the present invention;

FIGURE 6 is a vertical section taken along line 6—6 of FIGURE 2 and showing the second transverse row of electrodes arranged according to the present invention;

Figure 7:
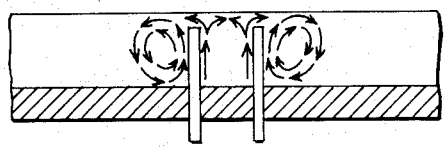
FIGURE 7 is a partial vertical section illustrating the nature of the convection currents resulting from the positioning too close to one another of two adjacent electrodes in a single transverse row of electrodes.

The furnace containing the novel electrode arrangement of the present invention is shown in FIGURES 1 and 2. A furnace indicated generally at 20 is provided with a crown or roof 22, a bottom wall 24, a rear wall 26, side walls 28 and a working zone extension 30. Rear wall 26 is provided with a suitable aperture 32 for introduction of batch material and is provided, if desired, with means for introducing hot gases of combustion, including a fuel jet 34. Intermediate rear wall 26 and working zone extension 30 there is provided a transverse bridge wall 36 having a throat 38 centrally located in its bottom.

In the normal course of operation of this furnace utilizing combustion heating alone, glass introduced through aperture 32 is fused in the melting zone, raw material which has not yet been fused forming a batch pile 40 on the surface of the glass mass at the feed end of the furnace as shown in FIGURES 1 and 2. After the feed ingredients have been fused and a series of complex physical and chemical reactions take place, the fused mass passes into the fining zone for the primary purpose of eliminating bubbles from the glass mass. The fined glass passes through throat 38 under bridge wall 36 into the working zone from which, after being worked for a suitable period of time, the glass is removed through suitable outlet ports.

As is well known in the glass art, one of the problems associated with the manufacture of glass in continuous furnaces is the insuring of the homogeneity of the glass produced. This problem results not only because of variations in conditions at different points in the furnace and the resulting variation in the physical and chemical reactions which take place in the glass mass.

It is known that the use of submerged electrodes to produce Joule effect heat in the glass batch will result in the formation of convection currents in the glass. This formation of convection currents is illustrated, for example, in FIGURE 4, which shows a single vertical electrode extending upwardly into the glass mass through the furnace bottom and which cooperates with other electrodes in the furnace (not shown) to produce Joule effect heat. The small arrows on either side of the illustrated electrode show the basic character of the convection current which is formed. The glass immediately adjacent the electrode is heated more than the glass at a greater distance since the cross-section of glass through which the current can pass along the path between a pair of electrodes becomes smaller as the current approaches the electrode, thus raising the resistance of the path. This hot glass participates in a thermal convection current with the cooler glass further away from the electrode, making the glass in the area of the convection current appear to be spring-like. While the boundaries of the area of turbulence are not sharp, studies indicate the area of turbulence to be bounded by an inverted cone having an apex angle of 60–90°.

In the present invention, the applicant relies upon the formation of convection currents through Joule effect heating as described above not only to effect thorough homogenization of the glass mass within the furnace, but to supply at least a portion of the heat requirements of the over-all furnace. To applicant's knowledge, the particular electrode arrangement which is employed in the instant invention to produce a novel system of individualized convection currents is far more effective than others devised to date in an attempt to produce the desired homogenizing results.

The electrode system of the present invention is illustrated in FIGURES 1–3, 5 and 6. As shown, rod-type electrodes 42 extend vertically upwardly from the furnace bottom 24 and are positioned in two parallel rows indicated generally at 44 and 46 extending transversely across the furnace, normal to the direction of flow of the glass batch. The electrodes in row 46 are staggered with respect to those in row 44, as clearly shown in FIGURE 2.

For best results, a polyphase source of electric power, such as the three-phase system illustrated in FIGURE 2, is provided and connected to the electrodes in the manner shown. Thus, terminal A of the three-phase source is connected to the electrodes designated A, terminal B to the electrodes designated by B, and terminal C to those electrodes designated as C. The result, when power is applied, is a series of current paths, designated by solid lines connecting the electrodes in FIGURE 3, resulting in current flow both transversely and longitudinally of the path of glass flow.

The electrodes in a given row (see FIGURES 5 and 6) should be so spaced from one another as to form cones of turbulence between them which are almost independent of one another so that there will be downward convection currents in the mid-region between electrodes, as shown in both FIGURES 5 and 6. The proper spacing to achieve this effect will necessarily vary depending upon the magnitude of the current passing between electrodes in a row per unit time and therefore cannot be fixed with any certainty, though under conventional operating conditions the electrodes in a given row will be spaced from one another by a distance approximately equal to the depth of the glass in the furnace.

Figure 8:
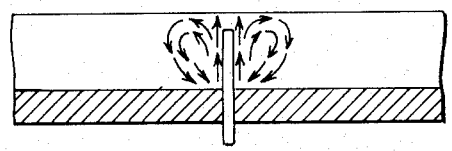
FIGURE 8 represents a side elevation of the pair of electrodes shown in FIGURE 7.

In the event the electrodes in a given row are too close to one another, convection currents between such electrodes will be effectively nullified (as illustrated in FIGURE 7) and mixing action between such electrodes will be stopped. Such a result is obtained through use of the electrode fence described in the aforementioned Borel Patent No. 2,277,678. As shown in FIGURE 8, however, such spacing of adjacent electrodes in a single row will have no effect upon the longitudinally extending convection currents, and thus mixing action in that direction will still take place.

Since, as shown in FIGURES 2, 5 and 6, the electrodes in row 46 are staggered with respect to those in row 44, downward convection currents will be followed by reversed, upwardly flowing convection currents in a single longitudinal plane along the furnace, and glass flowing past the two rows of electrodes will thus be thoroughly mixed through the complete reversal in the cones of turbulence. This arrangement of electrodes assures a better quality of mixing than any electrode arrangement of which the aplicant is presently aware.

Figure 9:
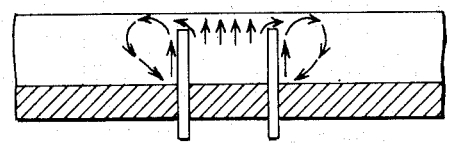
FIGURES 9, 10 and 11 illustrate side elevational views in partial section of three different electrode arrangements, the distance between transverse rows of electrodes being varied in each of the three views illustrated.

The foregoing description is directed primarily to the nature of the convection currents which are formed transversely of the glass flow through the furnace. As will be apparent, the spacings between individual rows 44 and 46 of the electrodes is also extremely significant. In the structure ilustrated in FIGURE 9, the rows of electrodes are so spaced from one another that the glass between the electrodes is permitted to lose heat to the furnace crown 22 and the furnace bottom 24 approximately in balance with the Joule heating effect, resulting in a lack of the temperature differential in the glass mass between the rows of electrodes necessary to form convection currents. As a result, there will be neither a rising nor a descending current of glass between these electrodes in practical effect.

Such an arrangement of electrodes, resulting in a hotter, relatively non-turbulent glass mass between rows of electrodes, has particular advantages, particularly in helping to dissolve residual sand grains and eliminating bubbles. While as indicated before, no particular universally usable separation between electrodes can be recited due to variations in current intensity and, accordingly, in the Joule heating effect, under normal conditions the spacing between rows of electrodes in this embodiment will approximate the depth of the glass in the furnace.

It will be recalled that this same spacing was suggested for the separation of adjacent electrodes in a given row, and yet the glass between such electrodes was described as forming independent, counter-current cones of turbulence resulting in a downward convection current in the mid-region between each pair of electrodes. The reason for the difference in the condition of the glass for a given spacing between transversely spaced electrodes and longitudinally spaced electrodes is readily comprehensible. Thus, the glass mass upstream from electrode row 44 and downstream from electrode row 46 is relatively cold and extracts heat from the glass between electrodes in each row, resulting in a significant temperature differential between the glass immediately adjacent the transversely spaced electrodes and the glass located midway between them, inducing transverse convection currents. The glass in the region between *rows* of electrodes, on the other hand, is heated on all sides and, since the heat loss to the furnace crown and bottom is approximately in balance with the heat gained through Joule heating effect, there is no source of cooling which can cause a convection current to function in the glass mass between the rows.

Figure 10:
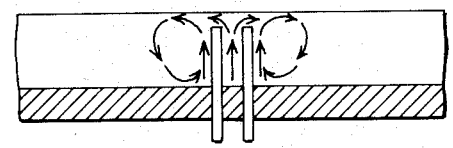

In the embodiment illustrated in FIGURE 10, the two rows of electrodes are so close together that the hot glass in the mid-region between rows participates in the longitudinal convection current and the effect is quite similar to that observed when a single row of electrodes are utilized.

Figure 11:
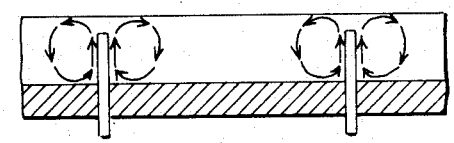

In the embodiment illustrated in FIGURE 11, the rows of electrodes are sufficiently far apart (usually greater than the depth of glass in the furnace) that the mass of glass between them is permitted to lose heat through the furnace crown and bottom so as to provide the source of cold glass which is necessary to cooperate with the hot glass adjacent the electrodes to form separate longitudinal convection currents.

As shown in FIGURE 5, the electrodes 48 located at the ends of row 46 are located sufficiently close to the side walls 28 of the furnace so that there will be no path through which the glass may flow without being subjected to the influence of a transverse convection current. As illustrated, if the distance between the end electrodes 48 and side walls 28 is approximately half the distance between electrodes in row 46, there will be a downward convection current at approximately the glass-side wall interface.

In the preferred embodiment of the present invention, the height of electrodes is relatively great, to achieve the maximum heating of the glass locally for liberation of gases. In practice, however, the electrodes should terminate short of the surface and preferably not extend closer to the surface than a distance equal to approximately one-tenth of the depth of the glass mass. In window glass furnaces having no throat in which the system of electrodes of the instant invention is used, the intensity of stimulation of the main longitudinal convection current should be kept at a low level, and accordingly, the electrodes should extend nearly to the surface of the glass so that the glass will not be heated too much in depth. In other types of furnaces, such as in furnaces for making colored glass bottles, it may be desirable to have the electrodes terminate somewhat lower than the glass surface for a greater stimulation of the longitudinal convection current.

Preferably, the novel electrode system of the present invention should be situated in the fining zone of the furnace, the heat from the electrodes not only serving to eliminate bubbles from the glass mass in that zone but serving to induce the formation of convection currents to thoroughly mix the glass mass to eliminate non-homogeneity. If desired, however, the electrode system may be elsewhere positioned in the furnace.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a glass furnace of the continuous type having a raw material feed end, a discharge end from which glass which is to be worked is removed and a plurality of glass-immersed rod-type electrodes connected to a power source and adapted to heat the glass through Joule effect, the improvement comprising: the arrangement of said electrodes in two spaced rows extending transversely across the path of glass flow; a power source; said electrodes being connected to said power source so as to establish transverse current flow through said glass and between electrodes in each of said rows and longitudinal current flow through said glass and between said rows of electrodes; the electrodes in each row being spaced from one another a distance approximately equal to the normal depth of glass in the furnace so as to permit the formation of a downward convection current of glass between each pair of adjacent electrodes in each of said rows.

2. A glass furnace as defined in claim 1 wherein the electrode on each end of each of said rows extends sufficiently close to a side wall of said furnace to ensure that substantially all of the glass passing said spaced rows of electrodes will come under the influence of the convection currents created by said electrodes.

3. A glass furnace as defined in claim 2 wherein said electrodes extend upwardly substantially vertically into the glass from the bottom of said furnace.

4. In a glass furnace of the continuous type having a raw material feed end, a discharge end from which glass which is to be worked is removed and a plurality of glass-immersed electrodes connected to a power source and adapted to heat the glass through Joule effect, the improvement comprising: the arrangement of said electrodes in two spaced rows extending transversely across the path of glass flow; a three phase power source; consecutive electrodes of each row being connected respectively to the first, second and third phase terminals of said power source; the power source connections in said rows being made so that adjacent but nonoverlapping triangles of current flow are established in the glass between said rows; the electrodes in each row being spaced from one another a distance approximately equal to the normal depth of glass in the furnace so as to permit the formation of a downward convection current of glass between each pair of adjacent electrodes in each of said rows.

5. A glass furnace as defined in claim 4 wherein the electrodes in one of said rows are staggered with respect to the electrodes in the other of said rows.

6. A glass furnace as defined in claim 5 wherein said electrodes are of the rod type.

7. In a glass furnace of the continuous type having a raw material feed end, a discharge end from which glass which is to be worked is removed and a plurality of glass-immersed electrodes connected to a power source and adapted to heat the glass through Joule effect, the improvement comprising: the arrangement of said electrodes in two spaced rows extending transversely across the path of glass flow; the electrodes in one row being staggered with respect to the electrodes in the other row; said electrodes being connected to a power source so as to establish adjacent but nonoverlapping polygons of current flow in the glass between said rows; the electrodes in each row being spaced from one another a distance approximately equal to the normal depth of glass in the furnace so as to permit the formation of a downward convection current of glass between each pair of adjacent electrodes in each of said rows.

8. A glass furnace as defined in claim 7 wherein said electrodes are of the rod type and extend substantially vertically upwardly from the bottom of the furnace into the glass; said polygons being triangles.

9. A glass furnace as defined in claim 8 wherein the electrode on each end of each of said rows extends sufficiently close to a side wall of said furnace to ensure that substantially all of the glass passing said spaced rows of electrodes will come under the influence of the convection currents created by said electrodes.

10. A glass furnace as defined in claim 8 wherein said electrodes extend upwardly to a point near the surface of the glass.

11. In a method of continuous glass manufacture in which raw material is fed into one end of a furnace and finished glass is removed from the other end, glass in various stages of chemical transformation flowing from the feed end towards the other, the improvement comprising: forming glass currents in two spaced and substantially parallel planes transverse to the direction of flow of glass in said furnace; the currents in each of said planes comprising a plurality of alternating upwardly and downwardly moving currents which are laterally spaced from one another in the direction of said planes; the upwardly moving currents of one plane being staggered with respect to the upwardly moving currents of the other plane so that the upwardly moving currents of one plane are substantially longitudinally in line with the downwardly moving currents of the other plane.

References Cited in the file of this patent

UNITED STATES PATENTS

| | | |
|---|---|---|
| 2,267,537 | Romazzotti | Dec. 23, 1941 |
| 2,749,378 | Penberthy | June 5, 1956 |
| 2,984,829 | Augsburger | May 16, 1961 |

FOREIGN PATENTS

| | | |
|---|---|---|
| 632,172 | Great Britain | Nov. 17, 1949 |

UNITED STATES PATENT OFFICE
CERTIFICATE OF CORRECTION

Patent No. 3,140,334                                             July 7, 1964

Harvey Larry Penberthy

It is hereby certified that error appears in the above numbered patent requiring correction and that the said Letters Patent should read as corrected below.

Column 1, line 53, for "Accordang" read -- Accordingly --; column 3, lines 20 to 24, strike out "This problem results not only because of variations in conditions at different points in the furnace and the resulting variation in the physical and chemical reactions which take place in the glass mass." read -- This problem results not only because of variations in the constituency of the batch of raw materials fed into the furnace but, as well, through variations in conditions at different points in the furnace and the resulting variation in the physical and chemical reactions which take place in the glass mass. --; column 4, line 36, for "aplicant" read -- applicant --.

Signed and sealed this 17th day of November 1964.

(SEAL)
Attest:

ERNEST W. SWIDER                                     EDWARD J. BRENNER
Attesting Officer                                    Commissioner of Patents